United States Patent [19]

Cyll et al.

[11] Patent Number: 4,717,808
[45] Date of Patent: Jan. 5, 1988

[54] CARBURETOR DEICER

[75] Inventors: Kenneth M. Cyll, W. Buxton; Mason G. Ide, Gorham, both of Me.

[73] Assignee: GTE Products, Stamford, Conn.

[21] Appl. No.: 856,547

[22] Filed: Apr. 28, 1986

[51] Int. Cl.⁴ .................. F02M 15/02; F02M 31/02; B60L 1/02
[52] U.S. Cl. ................................. 219/207; 219/206; 219/505; 338/22 R; 261/142; 123/545; 123/546; 123/549
[58] Field of Search ............. 219/206, 207, 504, 505, 219/540, 551; 338/22 R; 123/545, 546, 547, 549; 261/142

[56] References Cited

U.S. PATENT DOCUMENTS 4,593,670 6/1986 Nara et al. .................. 219/206 X

Primary Examiner—Patrick R. Salce
Assistant Examiner—Emanuel Todd Voeltz
Attorney, Agent, or Firm—James Theodosopoulos

[57] ABSTRACT

A heater for a fuel supply system including a carburetor and a manifold for an internal combustion engine, the heater including an electrically inert core and at least one PTC disposed within a cavity in the core, the PTC heater being disposed upon an electrically conductive stratum such as copper sheet and a graphite stratum disposed next adjacent the conductive stratum, the graphite stratum acting as a compressible heat transmitting gasket between the fuel heater and the carburetor whereby to heat the fuel and prevent icing.

16 Claims, 2 Drawing Figures

CARBURETOR DEICER

FIELD OF THE INVENTION

The present invention relates to self-regulating heaters and particularly those which utilize electrically heated positive-temperature-coefficient (PTC) heaters for use with the fuel entry systems of gasoline-operated internal combustion engines. The heater of the present invention is especially useful for rapidly heating fuel that will be fed to the engine, whereby gasoline droplets are evaporated to minimize the need to run a cold engine for a significant amount of time before moving the vehicle. The heat-up cycle of the engine is substantially reduced through the use of the fuel heater as described herein, thereby conserving significant amounts of fuel.

DESCRIPTION OF THE PRIOR ART

Fuel heaters are well known to the art and many of these fuel heaters have involved the use of PTC heaters in their construction to preheat the fuel-air mixture as it passes from the carburetor to the fuel intake manifold before being delivered into the cylinders of the engine. Such fuel heaters have been disclosed, for example, in the U.S. Pat. No. 4,242,999 to Hoser. In the Hoser Patent, a multiplicity of PTC heaters in the shape of a "pill" are taught. These PTC heaters are arranged in the intake manifold and heat a "stove-top" which radiates its heat upon the fuel-air mixture passing by it. The PTC heaters are electrically connected by lead wires to the battery through the starter system. The "stove" is positioned so that the gasoline coming from the carburetor will come in contact with the heater and be heated thus causing the gasoline to evaporate. The top plate of the stove has high thermal conductivity and is in direct heat-transfer relationship with the PTC heater. As the engine heats up, so that the gasoline naturally evaporates from efficient running of the engine, the PTC heater turns itself off due to changes in the crystal structure of the composition itself.

The U.S. Pat. No. 4,141,327, to Marcoux, discloses a heater comprising a PTC body which is mounted at the outlet of the fuel-air passage of the carburetor. The fuel-air mixture passes through openings in the PTC heater to facilitate vaporization and mixing of the fuel in the air-fuel mixture. Electrically inert gasketing material separates the two sides of the PTC heater from the carburetor and the manifold. Separate wiring is utilized to provide current to each of these sides.

The U.S. Pat. No. 4,384,563, to Seifer, discloses the use of a PTC heater, similar in some aspects to that which is disclosed in the Marcoux patent mentioned above. The Seifer patent discloses, however, an independently operable PTC heater disposed between the carburetor and the manifold. The PTC heater of the Seifer patent contains a number of openings through which the fuel-air mixture passes for heat-transfer. In another patent to Seifer, U.S. Pat. No. 4,406,785, patentee discloses the use of a plurality of pill-like PTC heaters disposed in a ring-array for use with diesel engines. This PTC heating system is arranged so that the diesel fuel passes through the heater to prevent gelling of the fuel prior to injection into the cylinders of the engine.

Another type of diesel fuel heater, similar to the Seifer described above, is disclosed in the U.S. Pat. No. 4,479,477, to Manchester. In the Manchester fuel heater, patentee describes a device that is readily adaptable for use as a retrofit in existing diesel fuel filter components.

SUMMARY OF THE INVENTION

According to the present invention, we have discovered a fuel heater and carburetor deicer which prevents icing under conditions of high humidity and low temperature. The fuel heater of the present invention is installed as an electrical heater using PTC elements. The heater is disposed in a location between the carburetor and the engine manifold. When the fuel heater and carburetor deicers of the prior art were used, most frequently, a cellulose or asbestos-filled gasket material was sandwiched in the assembly to form a seal. The gasket materials that were usually used in the past had low thermal conductivity which became the limiting factor in how much heat could be transferred to the carburetor.

We have discovered that through the use of a thin sheet of electrically conductive graphite as the gasket material, heat transfer in excess of 170 watts is attainable. A gasket material formed of graphite can conduct current from the negative side of the circuit in the automobile since it can be electrically connected to it through the graphite. A good vacuum seal is still obtained without the use of conventional asbestos or cellulosic material because of the compressibility of the sheet graphite. Most importantly, the improved heat-transfer from the heater to the carburetor through the use of a graphite stratum enables the carburetor assembly to heat quicker which is highly important when the engine is first started and is still cold.

The fuel heater of the present invention is a laminated construction which includes an electrically inert core, preferably formed of a phenolic resin. The core has a throat aperture located centrally therein for the passage of a fuel-air mixture therethrough. At least one PTC heater is disposed within a cavity in the core and bonded to an electrically conductive stratum which conducts electricity from one side of the power supply to one side of the PTC heater. Preferably, an array of PRC heaters in the shape of pills is arranged in a ring around the perimeter of the aperture through which the fuel-air mixture passes, thereby increasing the heat that is generated. These individual PTC heaters are connected to the positive side of the power supply by means of a circumferential ring which encircles most, if not all, of the central aperture. The conductive stratum, upon which the PTC heaters are disposed, is a metal sheet of high thermal and electrical conductivity, preferably copper, which has a throat aperture conforming generally in size and shape to the aperture in the phenolic core. The conductive stratum is sandwiched against the compressible graphite stratum. The graphite stratum is connected with the other elements of the automotive assembly and can conduct current from the negative side of the power supply to the PTC heater. The graphite stratum not only acts as a conductor of current, but also serves as an efficient gasketing material for the fuel system.

PTC heaters have been in use for many years. Such heaters offer several operating advantages over conventional resistance heating elements in the heating of fuels. They can be made in a flat shape and are formed, generally, of doped barium titinate ceramics which have a sharp positive temperature coefficient of resistance. The PTC heaters are designed such that below a critical temperature, the resistance of the ceramic remains at a low value and is essentially constant. When a particular temperature is reached, a crystalline phase change takes place in the ceramic and this abrupt change in crystal structure is accompanied by a sharp increase in the resistance and the crystalline grain boundaries. The result of this crystalline change is an increase in the heater resistance of several orders of magnitude over a very small temperature range. A barium titinate heater with a room temperature resistance of 3.0 ohms will increase to 1,000 ohms or more during the crystalline phase change. The temperature at which the crystalline phase change takes place can be adjusted in the PTC manufacturing process through the use of appropriate chemical additives and can be varied between −50° C. and 300° C. When energized with a suitable voltage by applying current to the opposite sides of the PTC heater, the ceramic rapidly heats up in a pre-determined operating temperature and then "locks in" at this temperature. This rapid heating is due to the initial low resistance of the PTC ceramic heater which results in an internal high power of the heater. The "lock in" is due to the abrupt increase in resistance which causes generated power to be reduced until it equals dissipated power. At this point, thermal equilibrium is achieved and the PTC heater self-regulates itself at that temperature. In this self-regulating mode, the fuel will continue to be heated at the pre-determined temperature as the fuel passes through the heater. This temperature is adequate to heat or vaporize the fuel sufficiently to prevent icing and for use under high humidity conditions in an engine on cold days.

BRIEF DESCRIPTION OF THE DRAWINGS

For a fuller understanding of the nature and desired objects of this invention, reference should be made to the following detailed description taken in conjunction with the accompanying drawings wherein like reference characters refer to corresponding parts throughout the several views of the preferred embodiment of the invention and wherein.

DESCRIPTION OF THE PREFERRED EMBODIMENT

Figure 1:
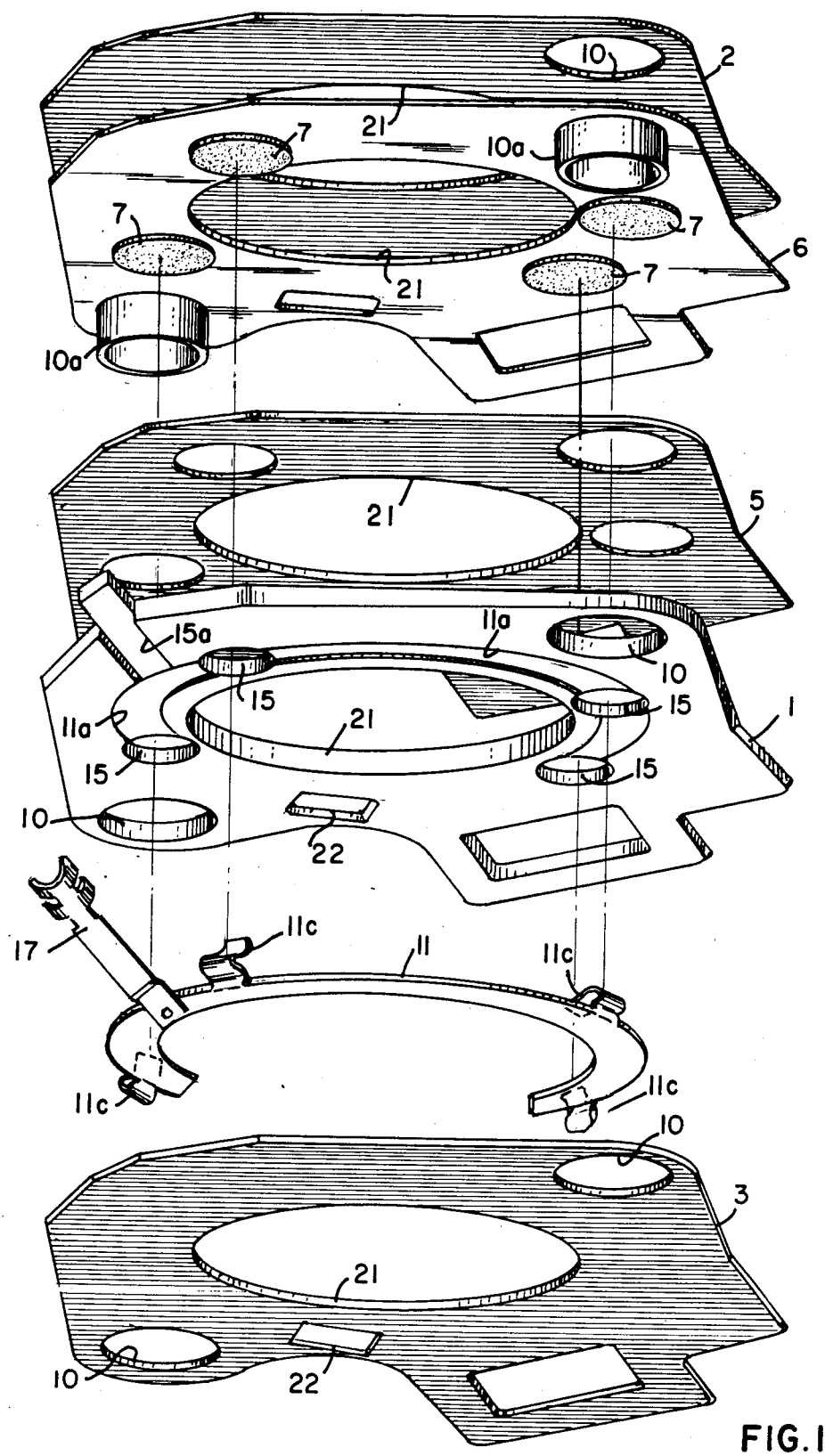
FIG. 1 is an exploded side view of the fuel heater of the present invention.

Referring now to FIG. 1, the carburetor heater and deicer of the present invention is a laminated structure, primarily formed in five main layers or stratum. An electrically inert central core 1 of a phenolic resin is disposed between a celluosic or asbestosic gasket material 3 which is used to form a vacuum seal. In turn, the gasket 3 is disposed against the intake manifold of the engine (not shown in this figure). High temperature thermally activated adhesives, as are conventually available in the automotive industry, are coated upon both sides of the gasket 3 and used to seal the gasket 3 to the core 1 and the intake manifold. A second celluosic or asbestoic gasket 5 is disposed upon the other side of the core 1 and attached thereto by similar high temperature, thermally active adhesives. The gasket 5 forms a vacuum seal between the phenolic core 1 and a conductive stratum 6 of the heater. The conductive stratum 6 is preferably a sheet of electrically and thermally conductive metal, generally copper. The PTC heaters 7 are bonded, preferably by soldering, to the conductive stratum 6. A stratum 2 of graphite sheet material is disposed between the conductive stratum 6 and the carburetor (not shown in this figure) and arranged to contact the carburetor and form a vacuum tight seal.

In the preferred embodiment, the stratum 2 is a thin sheet of fibrous graphite, the fibers of which are matted or woven together to form a sheet. A thin sheet of aluminum foil is disposed on one, or preferably both sides, of the sheet of graphite to give it support. An example of the fibrous graphite that can be used is sold under the name Grafoil, a trade name of the Union Carbide Corporation. The gasketing material should be as thin as possible, 1/64 inch generally being the thinnest that should be used.

A conductive ring 11 with spring members 11c attached thereto is disposed within a mating channel 11a. PTC heaters 7 are disposed within corresponding cavities 15 formed in the phenolic core 1. The channel 11a communicates the cavities 15 and the spring members 11c engage the one side of the PTC heaters 7. A tongue 17 extends from a ring 11 through a channel in the phenolic core 1. Tongue 17 is used for attachment of the ring 11 to the positive side of the power supply. The tongue 17 is disposed in a channel 15a that communicates with channel 15 in the phenolic core 1. Channels 15 and 15a are sufficiently deep to hold ring 11 and tongue 17 and enable the celluosic gasket 3 to lie flat against them.

A central throat or aperture 21 is disposed in each of the stratum of the fuel heater of the present invention to enable the fuel-air mixture to pass from the carburetor through the heater and into the manifold. Bolt holes 10 are appropriately disposed in each stratum of the fuel heater so that it can be securely bolted to the carburetor and the manifold. Bolt collars 10a extend from conductive stratum 6 to provide additional support to the assembly.

The graphite stratum 2 will conduct electricity, as well as the two aluminum sheets that encase it. But since the aluminum sheets are preferably secured to the conductive stratum 6 and the carburetor by means of a thermally active cement, it is frequently wisest to urge a spring (not shown) connected to the ground or negative side of the power supply against the conductive stratum 6. The ground spring is preferably disposed in openings 22 in the gasket 3, the core 1 and the gasket 5, whereby it will abut conductive stratum 6. When the ground spring is attached to the negative side of the power supply, and conductive ring 11 is attached to the positive side, current is conducted to both sides of the PTC heaters 7.

Moreover, the use of the graphite stratum 2 has another significant advantage. When the conductive stratum 6 becomes hot due to the action of the PTC heaters 7, the heat will be transmitted through the graphite stratum 6 to the carburetor which is disposed upon it. Most cellulosic or asbestosic gasketing materials commonly used today are thermal insulators and heat will not be effectively transmitted to the carburetor unless the gasket is extremely thin, thus lessening its gasketing properties. Thicker graphite stratums can allow for the effective sealing and rapid transmission of heat and warming of the carburetor.

Figure 2:
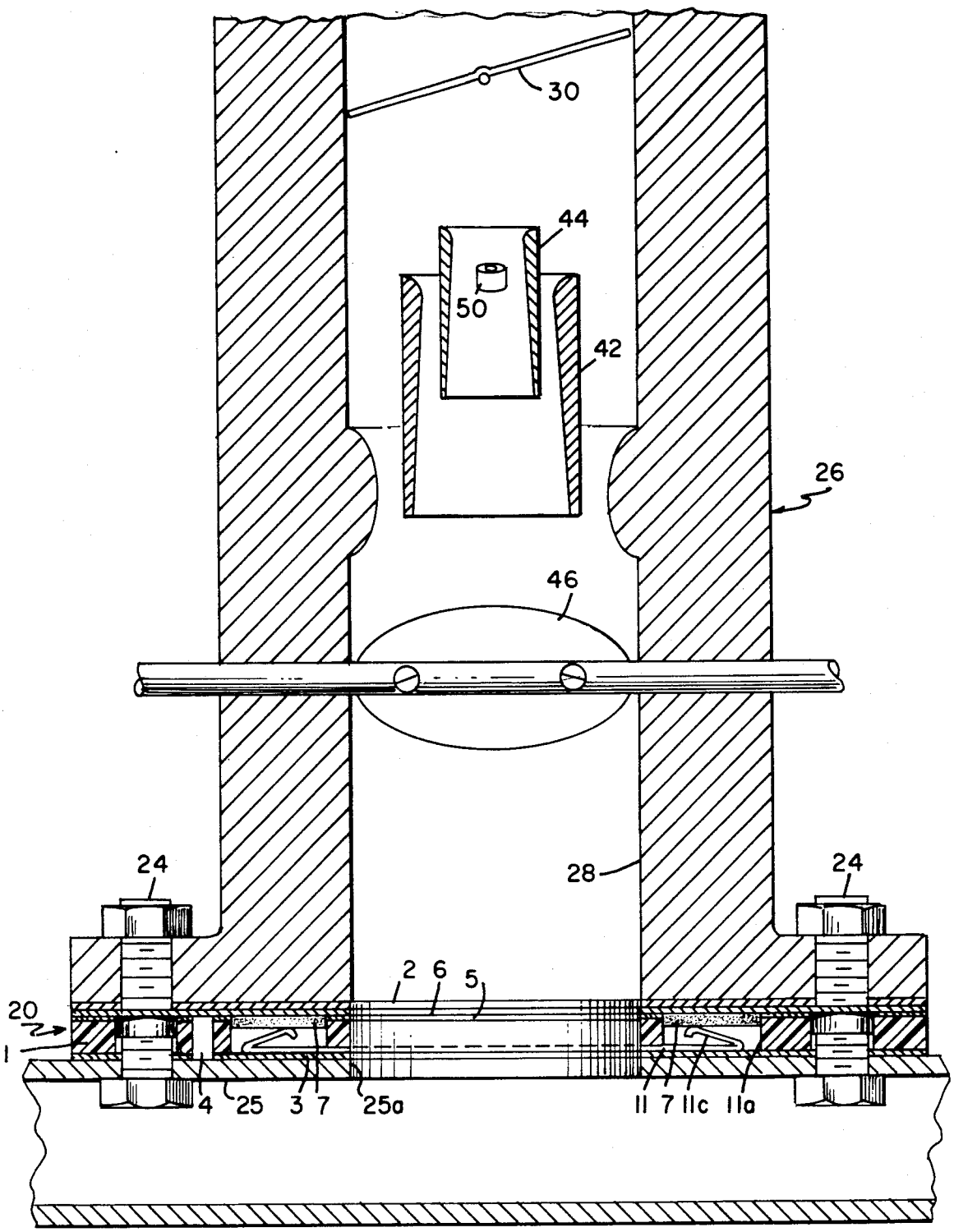
FIG. 2 is a side elevational view, partially in cross section, showing the disposition of the fuel heater of the present invention between a manifold and a carburetor of an internal combustion engine.

Turning now to FIG. 2, the preferred placement of the fuel heater according to the present invention is shown. Fuel heater 20 is disposed upon an aperture in the intake manifold 25. Bolts 24 secure a carburetor 26 to the fuel heater and, in turn, to the intake manifold 25. The aperture in the manifold is in direct alignment with the aperture in the fuel heater 20, which, in turn, is in line with the carburetor passageway or barrel 28. Air enters barrel 28 as permitted by choke butterfly valve 30, passing through a main venturi 42 and a boost venturi 44 at which point gasoline is introduced through orifice 50 to mix with air and pass as allowed by throttle valve 46, through the fuel heater and into the intake manifold 25. Throttle valve 46 is connected by linkages to the throttle of the internal combustion engine. Upon engaging the ignition switch of a cold gasoline engine, electrical power from a battery is instantly supplied to the fuel heater 20, which in turn heats the carburetor 26 to prevent icing. When the engine temperature causes the PTC heaters 7 to reach their preselected anomaly temperature, the resistance of the heaters will change and virtually terminate the power requirement.

In the location between the manifold 25 and the carburetor 26, the graphite stratum 2 will abut directly against the base of the carburetor 26. Conductive stratum 6 is disposed against the graphite stratum 2 and, in turn, PTC heaters 7 are bonded to conductive stratum 6, preferably by soldering. In the preferred embodiment, current from the negative side of the power supply is conducted to the conductive stratum 6 by means of a spring 4 which is housed in cavity 22.

Since one side of the PTC heaters 7 is connected to the conductive stratum 6, the current can flow to that side. Electrical contact is established with the other side of the PTC heaters 7 by means of the springs 11c, that are extensions to conductive ring 11, which, in turn, is connected to the positive side of the power supply by means of the tongue (not shown). The conductive ring is electrically insulated from the rest of the automobile by means of the core 1 and the cellulosic or asbestosic gasket 3, which seals the ring 11 in place in the channels 11a in the core 1 and electrically insulates the ring 11 from the manifold 25.

It is apparent that modifications and changes can be made within the spirit and scope of the present invention, but it is our intention, only to be limited by the scope of the appended claims.

As our invention we claim:

1. A heater for fuel supply systems, said heater comprising:
    an electrically inert core having an aperture therein for the passage of a fuel-air mixture therethrough; and
    at least one PTC heater disposed within a cavity in said core, said PTC heater being disposed upon an electrically conductive heat transmitting metal stratum, whereby to conduct current from one side of a power supply to one side of said PTC heater; and
    means connecting the other side of said PTC heater to the source of the electricity and means electrically insulating said connecting means from the other elements of said heater; and
    a graphite stratum disposed against said electrically conductive heat transmitting metal stratum whereby to act as a heat transmitting gasket for attachment of the heater to a carburetor.

2. The heater according to claim 1 further including a cellulosic gasket member disposed between said conducting means and said inert core.

3. The heater according to claim 1 wherein the sheet of metal is copper.

4. The heater according to claim 1 further including aperture means in said sheet whereby to provide an opening for the passage of the fuel-air mixture.

5. The heater according to claim 1 wherein an array of PTC heaters is disposed around said aperture means and upon said electrically conductive stratum and a plurality of cavities are disposed within said core to receive said PTC heaters.

6. The heater according to claim 5 further including an electrically conductive ring disposed within said core and attached to an external power supply and further including spring means which urge against the PTC heaters.

7. The heater according to claim 1 or 5 wherein said graphite stratum includes a layer of fibrous graphite disposed upon a sheet of foil.

8. The heater according to claim 7 wherein the graphite layer is sandwiched between two foil layers.

9. In combination with a manifold and a carburetor of an internal combustion engine, a heater for heating fuel supply systems disposed between said manifold and said carburetor, said heater comprising:
    an electrically inert core having an aperture therein for the passage of a fuel-air mixture therethrough; and
    at least one PTC heater disposed within a cavity in said core, said PTC heater being disposed upon an electrically conductive heating transmittal metal stratum whereby to conduct electricity to one side of a power supply to one side of said PTC heater; and
    means connecting the other side of said PTC heater to the source of electricity and means electrically insulating said connecting means from other elements of said heater, said manifold, and said carburetor; and
    a graphite gasket stratum disposed between said carburetor and said conductive heating transmittal metal stratum, whereby heat from said PTC heater is carried to said carburetor from said PTC heater.

10. The heater according to claim 9 further including a cellulosic gasket member disposed between said conducting means and said inert core.

11. The heater according to claim 9 wherein the sheet of metal is copper.

12. The heater according to claim 10 further including aperture means in said sheet whereby to provide an opening for the passage of the fuel-air mixture in communication with the aperture in the electrically inert core.

13. The heater according to claim 9 wherein an array of PTC heaters is disposed around said aperture means and upon said electrically conductive stratum and a plurality of cavities are disposed within said core to receive said PTC heaters.

14. The heater according to claim 13 further including an electrically conductive ring disposed within said core and attached to an external power supply and further including spring means which urge against the PTC heaters.

15. The heater according to claim 9 wherein said graphite stratum includes a layer of fibrous graphite disposed upon a sheet of foil.

16. The heater according to claim 15 wherein the graphite layer is sandwiched between two foil layers.

* * * * *